Patented Nov. 5, 1940

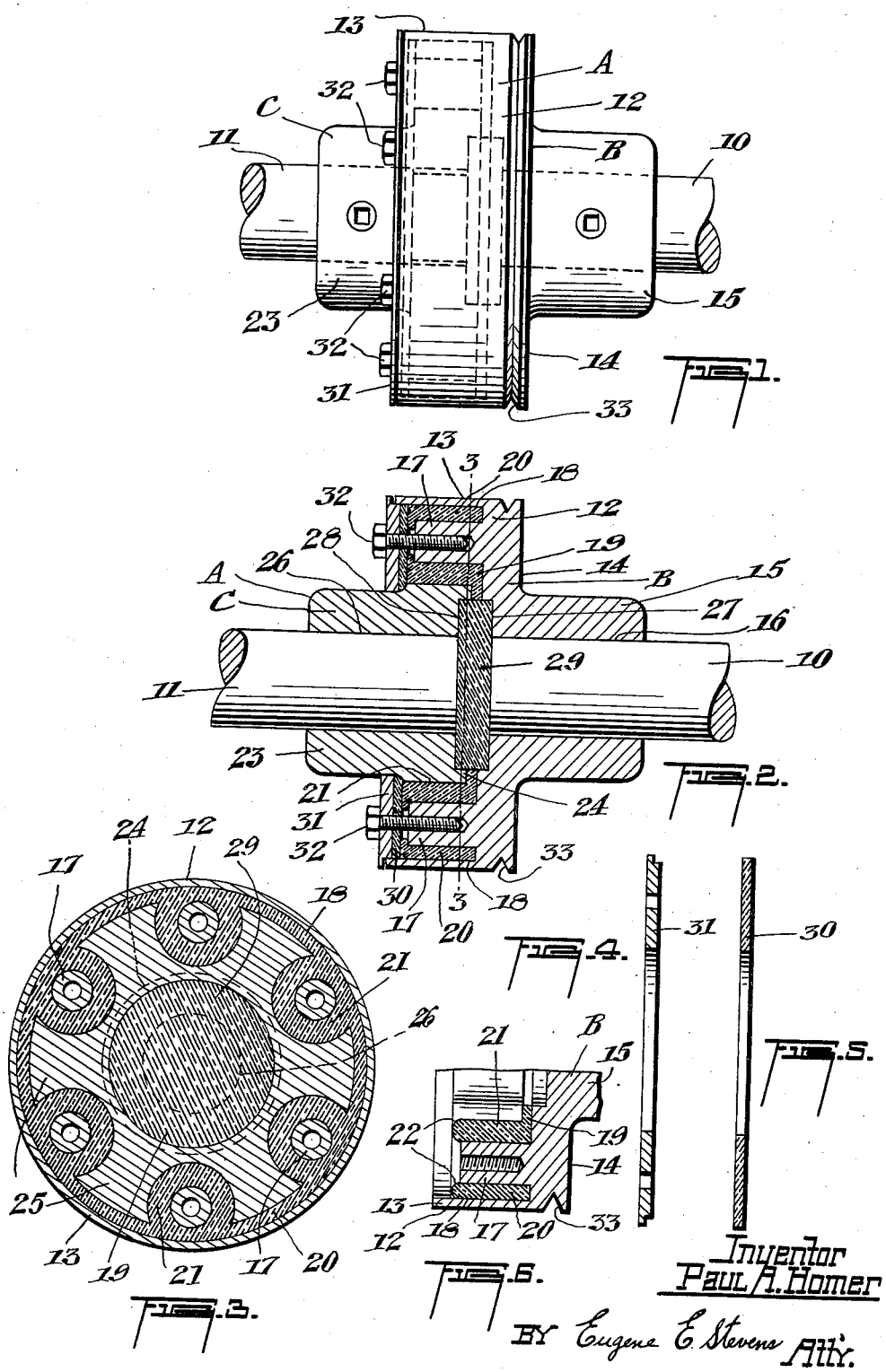

2,220,622

UNITED STATES PATENT OFFICE 2,220,622

FLEXIBLE INSULATED COUPLING

Paul Aitken Homer, Victoria, British Columbia, Canada

Application May 31, 1938, Serial No. 210,966
In Canada June 10, 1937

4 Claims. (Cl. 64—14)

This invention relates to flexible insulated couplings and particularly adapted for connecting the driving and driven shafts in marine engines and the like.

Shaft couplings are extensively used throughout the various industries for connecting driving and driven shafts and couplings of both the rigid and flexible type are employed. The rigid types in many cases are not suitable since they do not permit relative movement of the driving and driven parts or any possible change in alignment of these parts, so that there results in many cases considerable play as between the parts set up by wear through usage while in other cases breakage often occurs. Such couplings, therefore, are not generally satisfactory, and particularly for marine usage.

Flexible couplings have heretofore been employed with a view to overcoming the disadvantages apparent in the rigid coupling and one form of coupling commonly used is of the universal joint type. This, however, while of comparatively simple construction in most cases is not really satisfactory since it becomes dirty and transmits dirt and the like to the mounting structure, due to the fact that it is exposed to grease, oil, water and the like which readily promotes such conditions, and has a deteriorating effect on the coupling. Moreover, such construction entirely lacks a satisfactory means to absorb or prevent the shock transmitted to the coupling through end thrust of the shaft when is direct or reverse motion, and has a tendency towards vibration and sound. Thus such a structure is not generally satisfactory and particularly in the fishing industry.

Flexible couplings of other types have also been proposed, with a view to avoiding the disadvantages of the universal type of coupling. In most cases, however, structures of the open type are provided which have substantially similar disadvantages to the universal type coupling. Furthermore, structures of this character have usually been made up of numerous parts, the arrangement being such that noise is not reduced to a minimum and end thrust not efficiently taken care of.

According to the present invention, the disadvantages of prior structures are avoided, by providing a flexible insulating coupling which may be adapted generally to shaft couplings and is particularly adaptable to use in connection with marine requirements, such as in fishing boats, yachts and the like, operating to reduce to a minimum vibration and sound conductivity between the driving and driven shaft eliminating noise and functioning to absorb the shock transmitted through end thrust. Moreover, the construction is made to enclose all the resilient and flexible portions of the device, thus avoiding damage from oil, grease or water and eliminating accumulation of dirt in the coupling and on the mounting or surrounding parts of the structure where the coupling is used. The structure also reduces noise and readily absorbs the shock and vibration caused through use of the clutch or reversing gear which is of particular importance and value when employed in boats.

The invention will be fully appreciated by reference to the following specification and accompanying drawing.

In the drawing:

Figure 1 is a side elevation of the coupling according to the present invention showing all parts connected together.

Figure 2 is a longitudinal section taken through the coupling.

Figure 3 is a transverse section taken on the line 3—3 of Figure 2.

Figure 4 is a transverse section taken through the cover plate for the coupling.

Figure 5 is a transverse section taken through the resilient member for absorbing reverse thrust on the shafting, and Figure 6 is a fragmentary detail section of part of the driven member of the coupling separated from the driving member showing the normal position of the resilient facing material within the coupling.

Referring to the drawing:

A indicates the coupling as a whole comprised by a driven member B and a driving member C connected respectively to the driven shaft 10 and driving shaft 11. The driven member is composed of a housing 12 having a peripheral side wall 13 and an end wall 14, the latter being formed with a hub 15 which is centrally bored as at 16 to communicate with the interior of the housing 12 and to receive the driven shaft 10. The interior of the housing is preferably provided with a plurality of studs 17 which project into the interior of the housing from the end wall 14 and are spaced from the peripheral side wall 13. The studs 17 are of less length than the width of the side wall 13 as clearly shown in Figure 2, and the end of the housing 12 opposite the end wall 14 is left open to receive the driving member C of the coupling. The interior of the housing 12 is preferably lined with a resilient facing or the like 18 which, in the preferred form of construction illustrated in the drawing, is formed with a base 19 and peripheral side wall 20 designed to fit respectively the end wall 14 and peripheral side 13 of the housing, the facing preferably carrying integral therewith tubular members 21 designed to fit over and encircle the studs 17. The width of the peripheral wall 13 and tubular members 21 is greater than the length of the studs 17 and preferably rounded, as shown in Figure 6 as at 22, for the purpose to be described hereinafter.

The driving member, similarly to the driven member, is formed with a hub 23 with which is connected the driving device 24 formed with radially disposed fingers or arms 25 shaped to coincide with the cross section of the driven member and to fit between and around the tubular facing of the studs 17. Thus, when the driving and driven members are connected together there is provided an efficient driving connection. The driving member is bored as at 26 to receive the driving shaft 11 and both the driving and driven members are formed with centrally disposed recesses 27 and 28 on their inner faces to form a housing or mounting for a resilient thrust pad 29 which, when the driving and driven members are connected together, is disposed between them and directly between the adjacent ends of the driven and driving shafts 10 and 11 respectively, so that the ends of these shafts directly abut this pad which functions to absorb the shock transmitted through end thrust, principally when under direct drive.

To absorb the shock transmitted through end thrust when in reverse, a resilient thrust pad or cushion 30 is positioned at the open end of the housing 12 designed to lie upon the resilient facing 19, the housing being completely closed by an annular cover plate 31 which is passed over the hub 23 of the driving member C and is secured by means of bolts 32 passing through the cover plate and secured in threaded bores formed in the studs 17. It will be noted that when the cover plate and thrust pad 30 are secured in position the projecting ends of the resilient tubular members 21 are compressed to extend over the studs 17 and thus moved into closer contact with the studs, housing and parts of the driving member so that they are expanded to produce a firm grip between the parts of the housing, while providing the necessary amount of resiliency to permit of efficient operation. Thus the particular formation of the resilient facing or tubular members 21 produces expansible means for maintaining the assembled driving and driven members firmly in unity.

The coupling when assembled is completely enclosed, providing a practical compact enclosed structure which will permit of driving operations under the varying conditions which develop in most types of constructions, will accommodate end thrust, and permit the necessary amount of flexibility, whereas the cushioning structure throughout is such as to avoid the noise and grinding set up in many types of coupling. The exterior of the housing wall 13 is provided with a peripheral groove 33 for the purpose of receiving and discharging any superfluous oil, grease or water that may accummulate on the outside of the coupling.

It will be apparent that while the preferred form of construction is illustrated the exact structure illustrated is not essential, as it will be realized that the driving member might be of different formation and connected with the driven member in a different manner as, for instance, fitting over the studs 17 which might be so spaced to be encircled by a flexible covering and receive the driving member in this manner. The coupling therefore is adaptable to changes while following the principles mainly involved.

Various modifications may be made in this invention without departing from the spirit thereof or the scope of the claims and, therefore, the exact forms shown are to be taken as illustrative only and not in a limiting sense, and it is desired that only such limitations shall be placed thereon as are disclosed in the prior art or are set forth in the accompanying claims.

I claim:

1. A flexible insulated shaft coupling comprising a unitary driving and a unitary driven member, a driving shaft connected to the former and a driven shaft connected to the latter, one of said members being in the form of an open-ended housing defined by an end wall and a peripheral wall, studs disposed within the housing integral with and projecting from the end wall and spaced from the peripheral wall, a resilient facing covering the interior walls of the housing and the studs, the other of said members being formed with fingers to engage between the studs of the first member when disposed within the housing to form a driving connection, a resilient thrust pad disposed between the adjacent ends of the driving and driven shafts and engaging the resilient lining of the housing, a resilient thrust pad disposed within and closing the open end of the housing and covering the ends of the studs and fingers, a cover plate disposed to bear upon said latter thrust pad and means for fastening said plate and said members together, said thrust pads and lining forming a continuous wall of resilient material between all moving parts.

2. A flexible insulated shaft coupling comprising a unitary driving and a unitary driven member, a driving shaft connected to the former and a driven shaft connected to the latter, one of said members being in the form of an open-ended housing defined by an end wall and a peripheral wall, studs disposed within the housing projecting from the end wall and spaced from the peripheral wall, a resilient facing covering the interior walls of the housing and the studs, the other of said members being formed with fingers to engage between the studs of the first member when disposed within the housing to form a driving connection, the facing surrounding the studs projecting beyond their ends and compressible over their ends when said coupling is fastened to expand the facing into firm engagement with the fingers, a resilient thrust pad disposed between the adjacent ends of the driving and the driven shaft, a resilient thrust pad disposed within and closing the open end of the housing and covering the ends of the studs and fingers, a cover plate disposed to bear upon said latter thrust pad, and means for fastening said plate and said members together.

3. A flexible insulated shaft coupling comprising a unitary driving and a unitary driven member, a driving shaft connected to the former and a driven shaft connected to the latter, one of said members being in the form of an open-ended housing defined by an end wall and a peripheral wall, studs disposed within the housing integral with and projecting from the end wall and spaced from the peripheral wall, a resilient facing covering the interior walls of the housing and the studs, the other of said members being formed with fingers to engage between the studs of the first member when disposed within the housing to form a driving connection, said members having their adjacent faces centrally recessed, the adjacent ends of said shafts extending to said recesses, a resilient thrust pad positioned within said housing and disposed and held within said recesses between and engaging the ends of said shafts, a resilient thrust pad disposed within and closing the open end of the housing and covering the ends of the studs and fingers, a cover plate disposed to bear upon said latter pad, and means for fastening said plate and said thrust members together.

4. A flexible insulated shaft coupling comprising a unitary driving and a unitary driven member, a driving shaft connected to the former and a driven shaft connected to the latter, one of said members being in the form of an open-ended housing defined by an end wall and a peripheral wall, projections within the interior of the housing, a resilient facing covering the interior walls of the housing and said projections, the other of said members being formed with fingers to engage between the projections of the first member when disposed within the housing to form a driving connection, the adjacent faces of said members being centrally recessed, the adjacent ends of said shafts extending to said recesses, a resilient thrust pad disposed between and held within said recesses between and engaging the ends of said shafts, a resilient thrust pad disposed within and closing the open end of the housing and covering the ends of the studs and fingers, a cover plate disposed to bear upon said latter pad and means for fastening said plate and said thrust members together.

PAUL AITKEN HOMER.